J. A. PLOPPER.
AUTOMATIC COMPRESSED BRICK MAKING MACHINE.
APPLICATION FILED APR. 22, 1908.
947,456.
Patented Jan. 25, 1910.
8 SHEETS—SHEET 1.
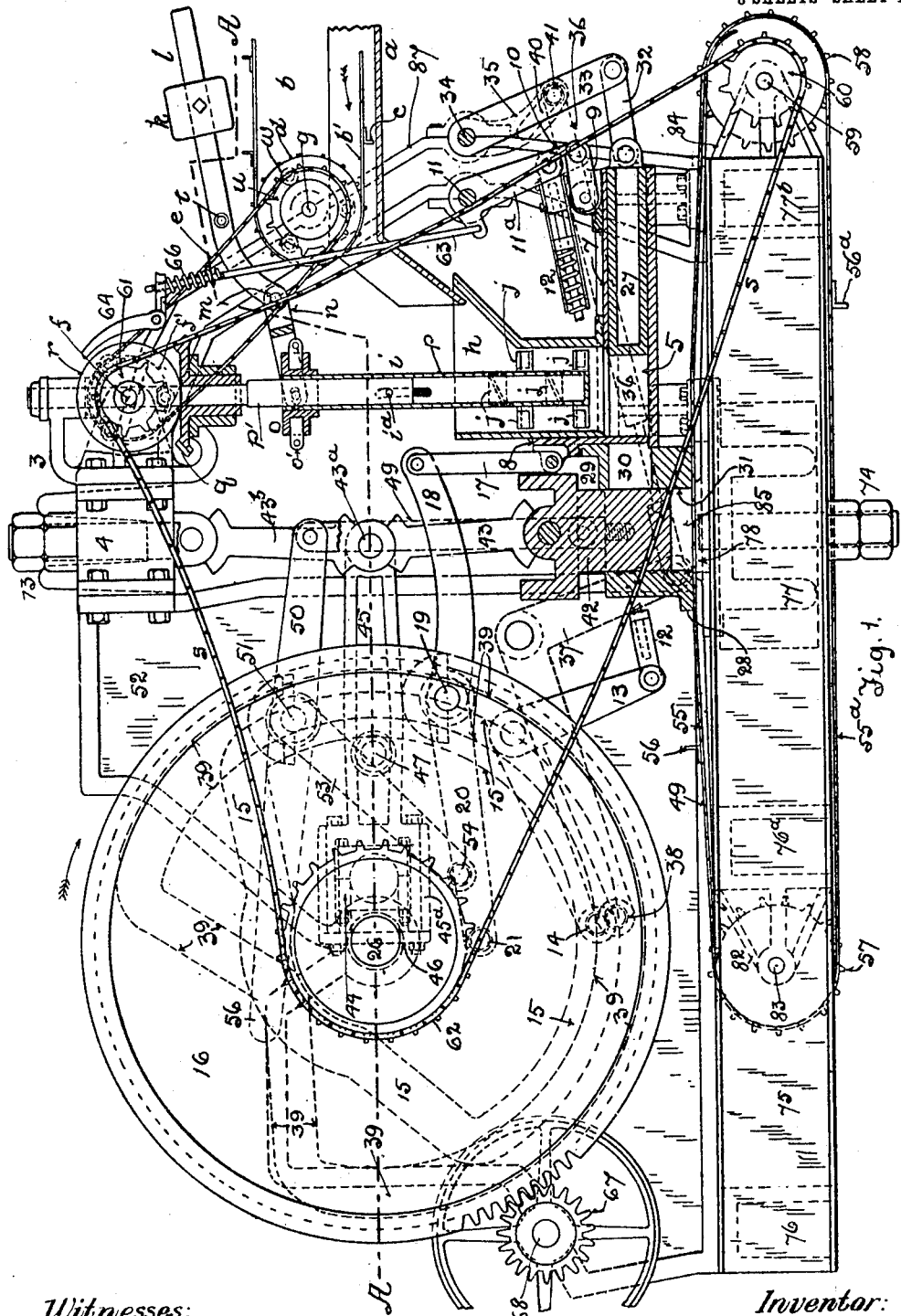
Witnesses:
A. D. Gerking
Cecil Long
Inventor:
James A. Plopper
by F. J. Geisler
Att'y.

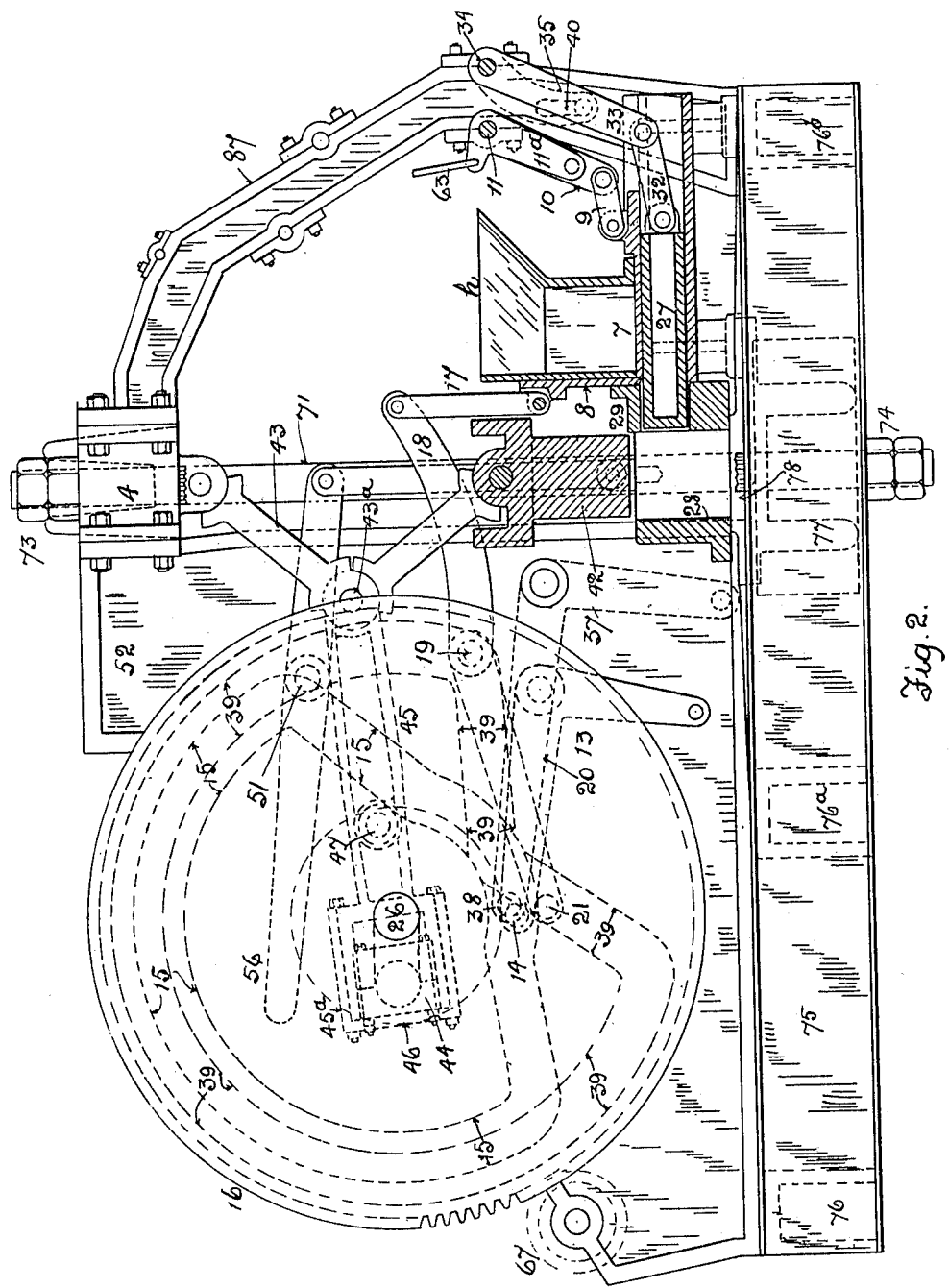

J. A. PLOPPER.
AUTOMATIC COMPRESSED BRICK MAKING MACHINE.
APPLICATION FILED APR. 22, 1908.
947,456.
Patented Jan. 25, 1910.
8 SHEETS—SHEET 3.
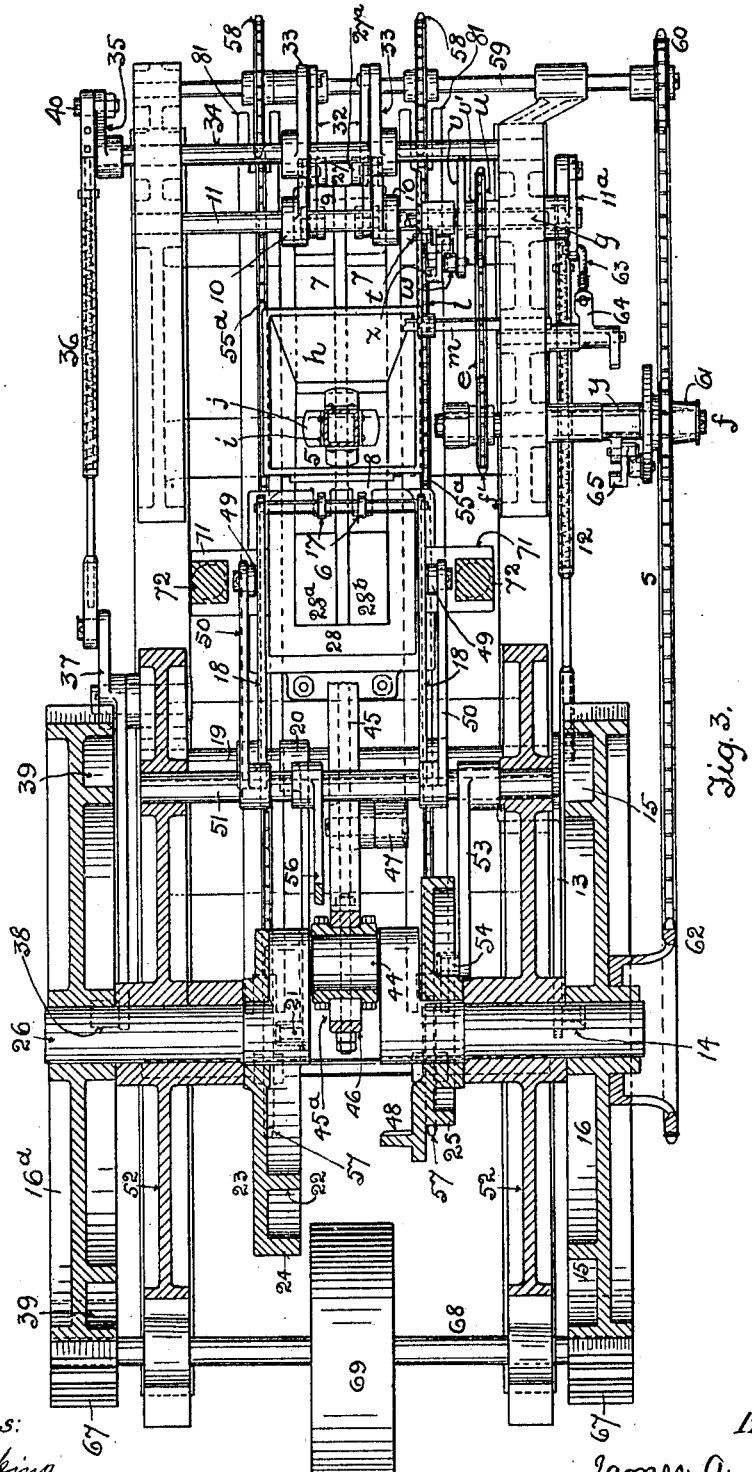
Witnesses:
A. D. Gerking
Cecil Long
Inventor:
James A. Plopper
by F. J. Geisler
Att'y.

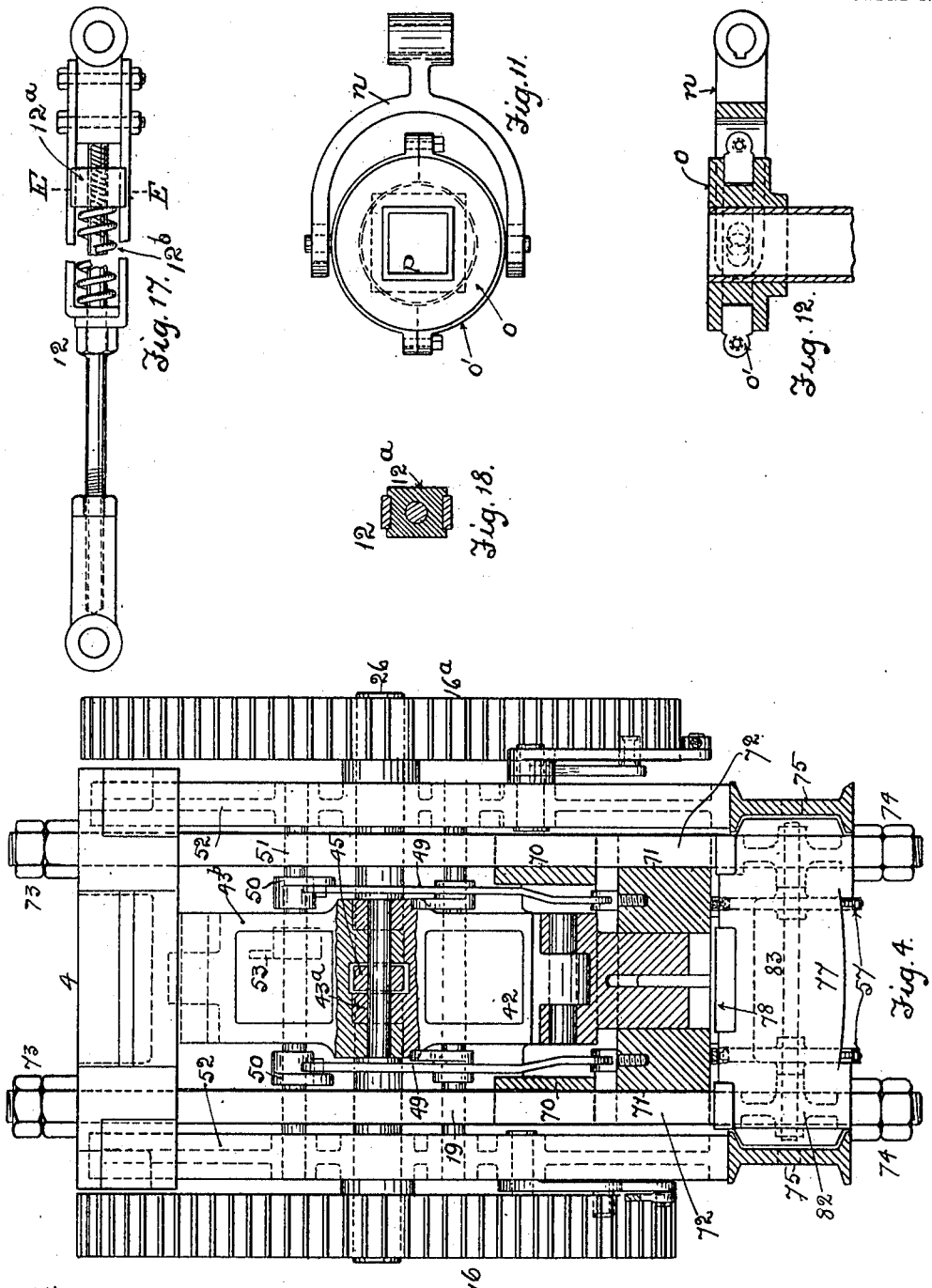

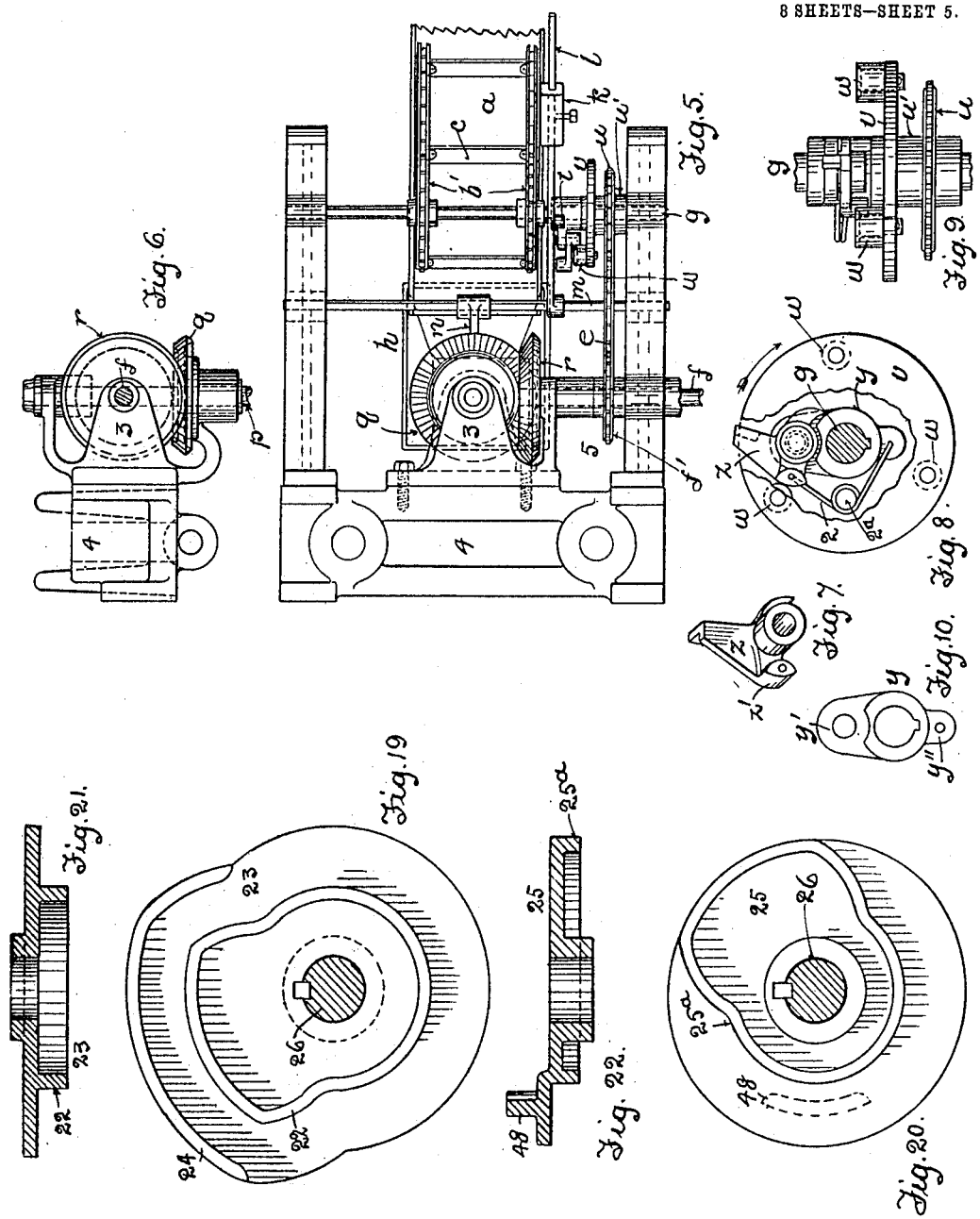

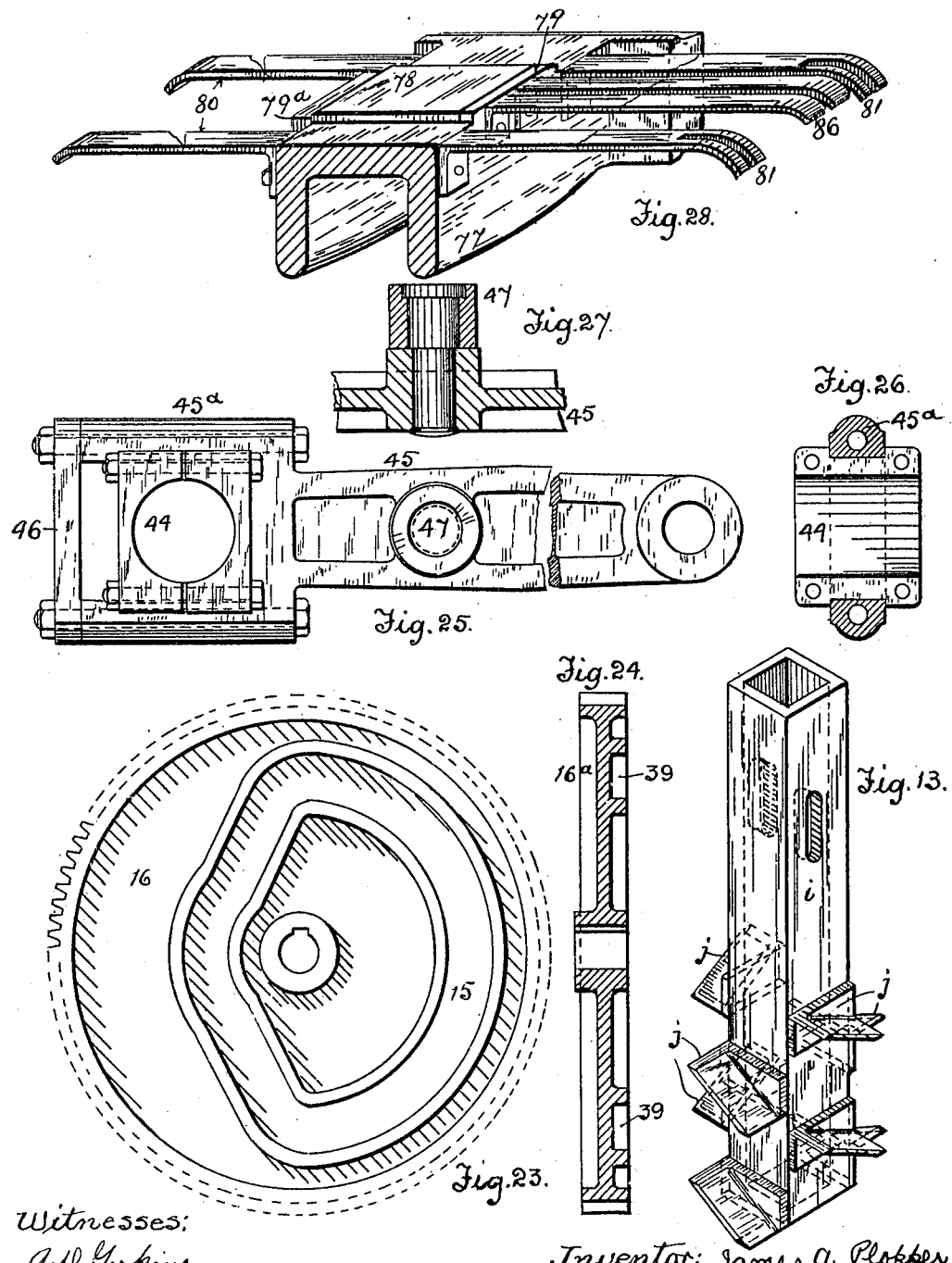

J. A. PLOPPER.
AUTOMATIC COMPRESSED BRICK MAKING MACHINE.
APPLICATION FILED APR. 22, 1908.
947,456.
Patented Jan. 25, 1910.
8 SHEETS—SHEET 7.
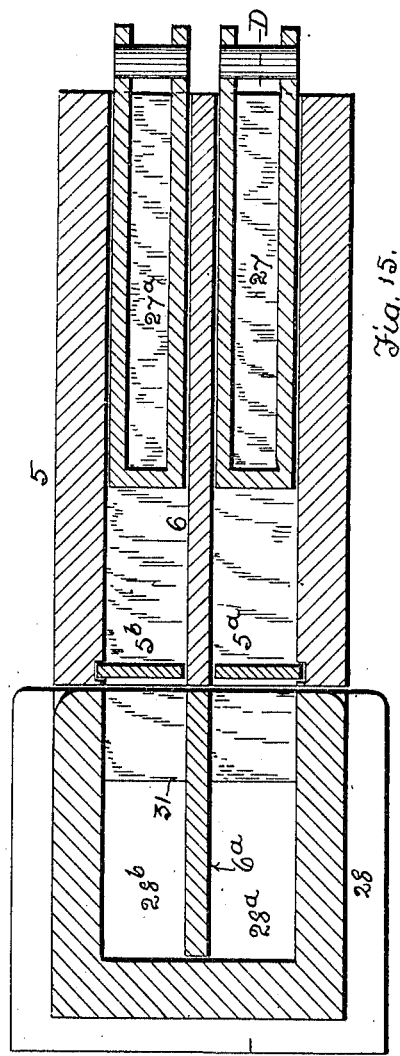
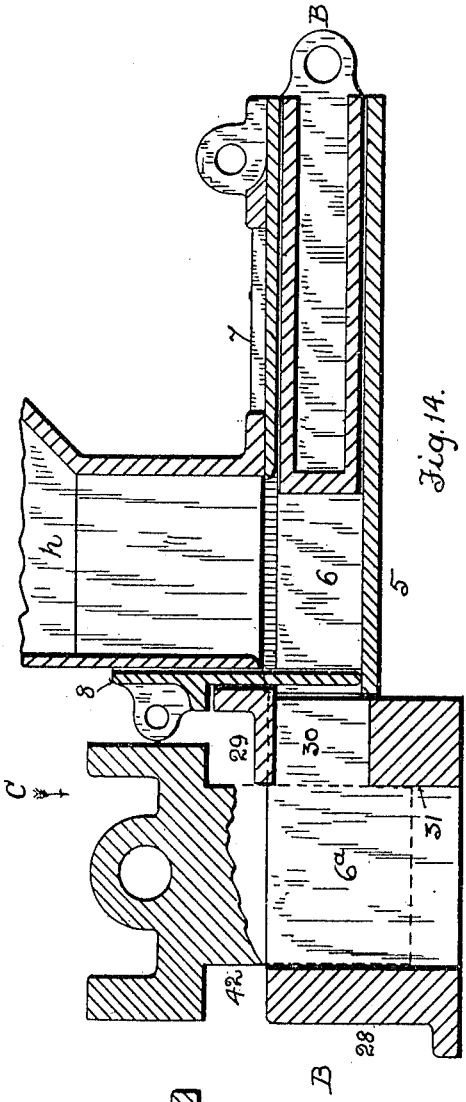
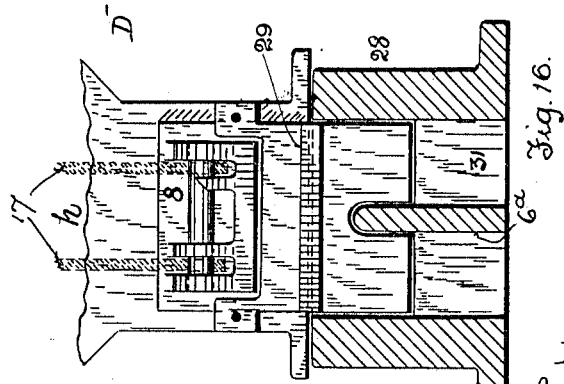
Witnesses:
A. D. Gerking
Cecil Long
Inventor:
James A. Plopper
by F. J. Geisler
atty.

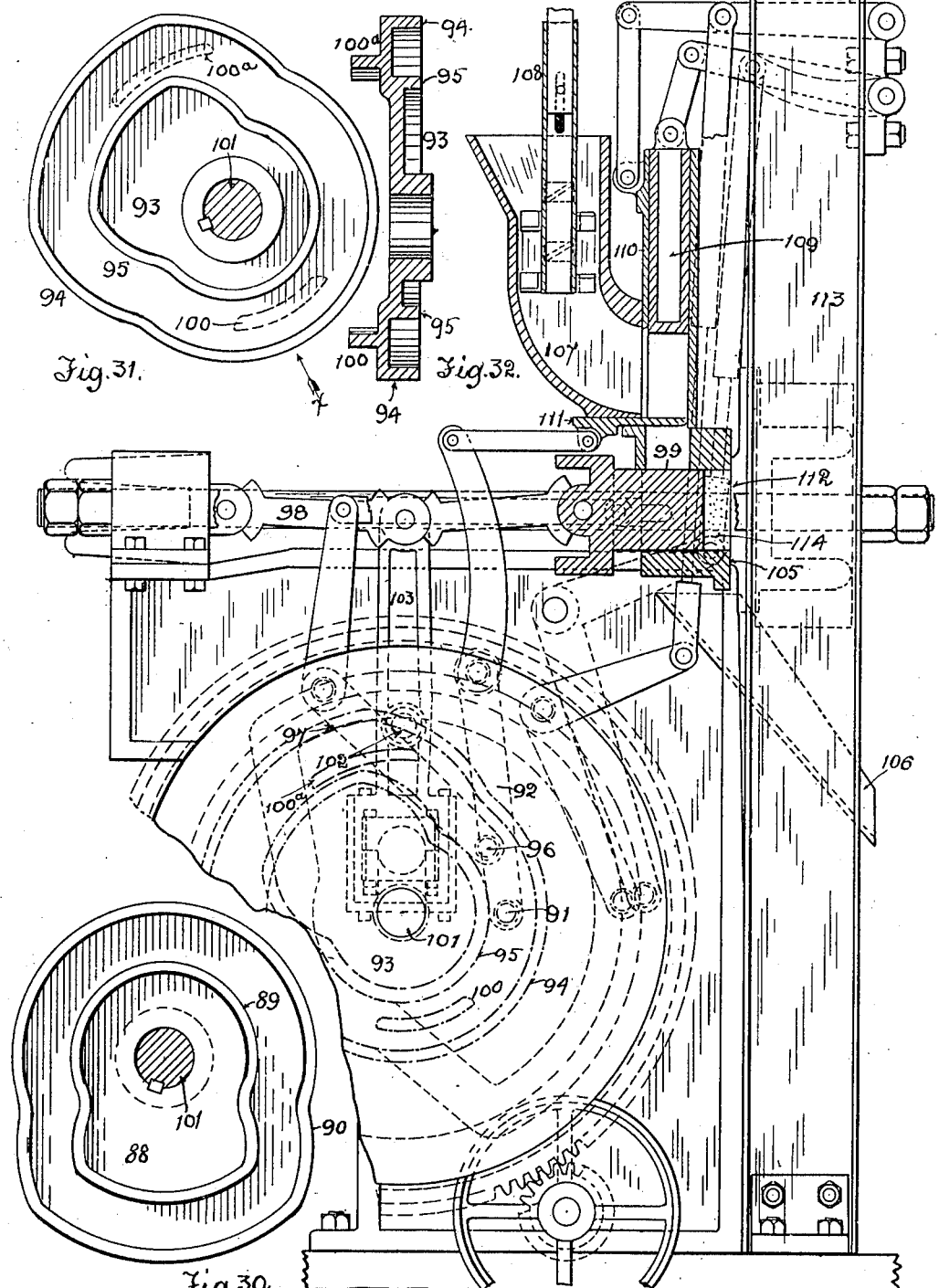

UNITED STATES PATENT OFFICE.

JAMES A. PLOPPER, OF PORTLAND, OREGON, ASSIGNOR OF ONE-HALF TO CHARLES E. MACK, OF PORTLAND, OREGON.

AUTOMATIC COMPRESSED-BRICK-MAKING MACHINE.

947,456.   Specification of Letters Patent.   Patented Jan. 25, 1910.

Application filed April 22, 1908. Serial No. 428,632.

*To all whom it may concern:*

Be it known that I, JAMES A. PLOPPER, a citizen of the United States, and a resident of Portland, in the county of Multnomah and State of Oregon, have invented a new and useful Improvement in Automatic Compressed-Brick-Making Machines, of which the following is a specification, reference being had to the accompanying drawings as constituting a part thereof.

This invention has for its object to obtain a machine which shall automatically perform the steps in the process of making compressed building bricks, as well as bricks and blocks of various material and for various purposes.

My invention also has for its object to so arrange the coöperating parts and devices as to obtain as a whole a machine which is durable and comparatively inexpensive to build and operate. I also have so arranged the parts as to be able to quickly change and adjust the machine to suit the particular kind of work to be done, and to facilitate the repair of those parts which bear the stress of the work.

My machine is also so contrived as to automatically avoid injury being caused to the working parts by reason of some larger sized, hard stones or other material accidentally getting into the stock which is worked into bricks or blocks by my machine.

To this end my machine embodies the particular features and combinations of parts, and operates as illustrated in the drawings above referred to, and hereinafter fully described.

In the drawings, Figure 1 is a side elevation of my machine with parts in section; Fig. 2 is a view like Fig. 1, with the feeding mechanism omitted, showing the working parts in a different position than seen in the preceding figure; Fig. 3 is a partial plan section, approximately taken on a line A—A of Fig. 1; Fig. 4 is a front elevation of my machine, but showing the mold and ram devices in transverse section; Fig. 5 is a plan detail, showing a part of the driving gear of the compressor mechanism and the stock or material-conveying device of my machine; Fig. 6 is a detail, in side elevation, of the driving gear of the compressor; Figs. 7, 8, 9 and 10 are details of the means for automatically causing an arrest of the action of the conveyer feeding stock into the hopper of the measuring chamber; Figs. 11 and 12 are details, the former being a top view, and the latter a longitudinal central section of the shaft of the stock-compressor; Fig. 13 is a detail showing in perspective elevation the lower part or shaft-section of the stock-compressor; Fig. 14 is a sectional detail of the hopper, the measuring chamber, the plungers, the mold and the ram, the section being taken on a line D—D of Fig. 15; Fig. 15 is a plan section taken on a line B—B of Fig. 14; Fig. 16 is a transverse section, taken on a line pointed by the arrow C in Fig. 14, the ram-head, however, being omitted; Fig. 17 is a detail of one of the yielding pitmen; Fig. 18 is a section on a line E—E of Fig. 17; Figs. 19 and 20 are details, showing, respectively, side elevations of the auxiliary cams of my machine; Fig. 21 is a plan section taken through the axial center of the cam shown in Fig. 19; Fig. 22 is a plan section taken through the axial center of the cam shown in Fig. 20; Fig. 23 is a detail illustrating the cam path on the interior face of the main drive-wheel on the front side of my machine; the cam path on the interior face of the drive-wheel on the rear side of my machine and the relative positions of both cam paths being traceable from Figs. 1 and 2; Fig. 24 is a vertical section taken through the axial center of the drive-wheel shown in Fig. 23; Fig. 25 is a detail showing, in elevation, the pitman transmitting motion from the main crank-shaft to the ram-operating device; Fig. 26 is a transverse section taken through the axial center of the sliding box of the pitman shown in Fig. 25; Fig. 27 is a detail in plan section, illustrating the arrangement of the laterally projecting stud-roller provided on the pitman shown in Fig. 25; Fig. 28 is a detail, showing the plate positioned below and constituting the bottom of the mold, and the ways therewith connected over which travels the conveyer removing the molded brick from my machine; Fig. 29 shows a modified arrangement of my machine, as will be fully explained below; Figs. 30 and 31 show corresponding modifications of the cams seen in Figs. 19 and 20, so as to adapt the latter to perform their functions in said modified type of my machine; and Fig. 32 is a section taken on a line *x* of Fig. 31.

Referring to the reference characters: the material hereinafter referred to as stock, out of which the brick or block is to be made, is deposited in the trough $a$, from a hopper not shown, and is thence conveyed by an endless conveyer $b$, consisting of sprocket-chains $b'$, provided with transverse scrapers $c$, (see Figs. 1 and 5) and driven by the sprocket-gears $d$; the latter being driven by a sprocket-chain $e$, transmitting the power from a sprocket $f'$, fast on the shaft $f$, to a sprocket $u$ loose on the shaft $g$.

The stock is discharged from the trough $a$ into the feeding hopper $h$. In the latter the stock is subjected to the first step in the process of compressing the same into a dense mass. For this purpose I provide a gravity compressor $i$, consisting of a rotating shaft on the lower end $p$ of which is a series of laterally projecting rigid arms or flukes $j$, preferably made with inclined faces, so as to have some extent the action of a feeding auger. The shaft $p$ is so arranged as to impose the weight thereof on the stock being compressed in the hopper $h$, subject to the control or counterbalance of the adjustable weight $k$, slidable on an arm $l$, fast on a shaft $m$, on which shaft is rigidly mounted a fork $n$, connected with a grooved collar $o$ (see details Figs. 11 and 12).

The adjustable weight $k$ is a variable counterbalance for the weight of the shaft $i$; whereby the weight of the latter may be diminished as required to suit the nature of the particular stock used. To the same end the shaft $p$ is made telescoping. As shown in the drawings, said shaft $p$ is made hollow like a sleeve, square in cross-section, and telescopes, that is to say, is slidably held on the upper shaft-section $p'$. To limit the drop of the lower shaft-section $i$, I provide a slot-and-pin connection $i^a$ for said shaft-sections.

The described gravity arrangement of the compressor also provides a part of the means for automatically stopping the feeding of the stock from the trough, $a$, into the hopper $h$, when the latter becomes over filled. This stopping act is performed as follows: When the hopper $h$ becomes filled with stock, the auger-like construction of the laterally projecting arms $j$ on the compressor causes the latter to climb up on the stock, the compressor being rotated by the bevel-gear $q$ meshing with a bevel-gear $r$, fast on the shaft $f$. On the near end of the shaft $f$ is a sprocket 61, over which runs a sprocket-chain $s$, connecting the sprockets 60, 62, the latter being on the hub of the near, main drive gear 16.

When the shaft $i$ is lifted by climbing up on the stock in the hopper $h$, the arm $l$ drops more and more, until finally the stud-roller $t$, laterally projecting from the arm $l$, engages with and trips the driving pawl $z$ of the shaft $g$ and stops the feeding of further stock into the hopper $h$ by arresting the action of the conveyer $b$. That is to say, the sprocket-chain $e$ drives the sprocket $u$, loose on the shaft $g$. On the hub $u'$ of the sprocket $u$ is cast a disk $v$, provided with a plurality of stud-rollers $w$. Adjacent the inner face of the disk $v$ there is rigidly mounted on the shaft $g$ a hub $y$ (see Figs. 8, 9 and 10) provided with ears $y'$, $y^2$. To the ear $y'$ is pivoted a driving pawl $z$ (see Fig. 7) held in the position shown in the detail, Fig. 8, by a spring 2, mounted on a stud $2^a$. The disk $v$ rotating in the direction indicated by the arrow in Fig. 8, causes one of the stud-rollers $w$ thereon to engage with said driving-pawl $z$, and by so doing to rotate the shaft $g$ and drive the conveyer $b$. But as soon as the stud-roller $t$, by reason of the lifting of the gravity compressor and the consequential lowering of the arm $l$, as mentioned, is brought into the path of the driving pawl $z$, the latter will be thrown back against the tension of the spring 2, and thereupon the stud-rollers $w$ of the disk $v$ will pass over the shoulder $z'$ of the pawl $z$, and no motion will be transmitted to the conveyer $b$, which will remain inactive until the lifting of the arm $l$ sufficiently to raise the stud-roller $t$ out of the path of said pawl $z$. This automatically results as soon as the quantity of stock in the hopper $h$ is sufficiently reduced to allow the compressor $i$ to descend to its normal position, which is approximately shown in Fig. 1.

The shaft-section $p'$ of the compressor $i$ is journaled in a bracket 3, bolted to the cross-beam 4 of the frames sides 52. The bracket 3 also provides the bearing for the shaft $f$, on which the sprocket $f'$, the sprocket 61, and the bevel-gear $r$ are mounted.

From the hopper $h$ the stock is dropped into the measuring-chamber 5, see Fig. 1. For brick, the measuring-chamber 5 is preferably longitudinally divided by a central partition 6 into two compartments $5^a$, $5^b$, see Figs. 14, 15 and 16. Said measuring chamber compartments are controlled by a pair of sliding gates 7, one for each compartment, said gates sliding in grooves between said partition 6 and the outer walls of the measuring-chamber 5. While the compartments of the measuring-chamber 5 are being filled the outlets of said compartments are closed by the vertical gate 8. Periodically the inlets from the hopper $h$ into the compartments of the measuring-chamber 5 are closed by the horizontal gates 7, the latter being operated as hereinafter described. As soon as the closing movement of the horizontal gates 7 is completed, the vertical gate 8 begins to lift and opens the outlets of the measuring-chamber 5. The movements of the horizontal gates 7 and the vertical gate 8 are accomplished by the following devices: The horizontal gates 7 are connected by links 9 to arms 10, rigid on a transverse rock-shaft 11. Rigid on one end of the rock-shaft 11 is an arm 11ª (see Fig. 3) connected by a telescoping, spring-controlled—or what may be termed a yielding—pitman 12 (see Figs. 17 and 18) to the pendent member of the bell-crank 13, fulcrumed in the near frame side 52. The opposite or horizontal member of the bell-crank 13 is provided with a laterally projecting stud-roller 14, working in a cam path 15, on the inner face of the near main driving-gear 16.

The vertical gate 8 is connected by links 17 to arms 18 of a rock-shaft 19, on which shaft is mounted a rigid arm 20, provided at its outer extremity with a stud-roller 21, traveling along the outer face of the inner flange 22 of a cam 23, shown only in the plan section Fig. 3, and in the details Figs. 19 and 21. The weight of the gate 8 keeps the roller 21 on the extremity of the arm 20 against the flange 22 of said cam 23, and thus provides also for the closing of said gate by gravity, during the revolution of said cam. The outer flange 24 of the cam 23 serves as a retaining flange to the stud-roller 21. The closing of the said gate by gravity also provides against breakage of the same in case of a solid substance obstructing the path of the gate.

The gears 16, 16ª and the cams 23, 25 are mounted on a main crank-shaft 26, journaled in the frame sides 52 of the machine.

29 is an angle-plate, the vertical member of which serves as a guide-face for the gate 8, which slides between said angle-plate 29 and guide flange provided on the left-end wall of the hopper h. The horizontal member of said angle-plate 29 provides a top closure for the passage 30, extending from the measuring compartment 5 to the mold 28. The wall 31 of the mold constitutes the bottom of the passage 30.

As soon as the vertical gate 8 has made its full opening movement, the plungers 27, 27ª are operated to eject the stock from the compartments of the measuring-chamber 5 into the mold 28, which is divided by a partition 6ª, a continuation of the partition 6, into compartments 28ª, 28ᵇ.

The two plungers 27, 27ª are connected by links 32 to arms 33, rigid on a transverse rock-shaft 34. On the rock-shaft 34 is also a rigid arm 35, connected by a yielding pitman 36 (seen in Fig. 3 and also shown in dotted outline in Fig. 1) to the pendent arm of the bell-crank 37, fulcrumed in the frame side 52 of the farther side of the machine. The other member of the bell-crank 37 is provided with a stud-roller 38, working in a cam-path 39, on the inner face of the main driving gear 16ª.

The starting or normal position of the plungers 27, 27ª may be changed from that shown in Fig. 1 to a position farther to the right, for the purpose of enlarging the measuring-chamber 5, when required to receive more stock, as for example, for the manufacture of a larger sized brick. This adjustment of said plungers is accomplished by making the arm 35 with the slot 40, so arranged that the finishing point of the stock-ejecting movement of said plunger will remain the same, regardless of their starting position. The right end of the yielding pitman 36 is connected with the slotted arm 35 by a clamp-stud 41.

While the stock is being ejected by the plungers 27, 27ª from the measuring-chamber 5 into the mold 28, the ram 42 is positioned as shown in Fig. 2. As soon as the plungers 27, 27ª have made their full discharge movement, the ram 42 begins to descend into the mold 28. Where the mold is made in two compartments, the ram-head is made divided to correspond, as shown in Fig. 4. The full downward or compressing movement of the ram 42 is shown in Fig. 1. The ram compressing the stock in the mold to the thickness of the brick.

The ram operating mechanism consists of the following: The head of the ram 42 is connected to the lower member of a toggle 43, the upper member 43ᵇ of which is connected to the cross beam 4 of the machine frame. The central joint 43ª of the toggle is connected by a pitman 45 with the main crank-shaft 26. The connection of the pitman 45 with the main crank-shaft 26 is effected by a sliding box 44, the arrangement of which feature is more readily observed from Figs. 25 and 26. The head 45ª of the pitman 45 is arranged to slidably hold the box 44, and the bar 46 limits the sliding movement of the box 44.

To hold the ram in its uplifted position, as it is shown in Fig. 2, during the interval the plungers 27, 27ª are operated to discharge the stock from the measuring-chamber 5 into the mold 28, the pitman 45 is made with a laterally projecting stud-roller 47, and the cam 25 is made with a segmental rib 48 concentric with the shaft 26, (see Figs. 3, 20, 22) concentric with the axial center of said cam 23. Said rib 48 is so arranged that during a part of the revolution of the main crank-shaft 26 it will engage the stud-roller 47, and by so doing hold the pitman 45, and therewith the ram 42 against a return movement, while the plungers are operating to discharge the stock into the mold 28. During such engagement of the stud-roller 47 by said rib 48, the head 45ª of the pitman 45 slides on the box 44. The sliding-box 44 in the pitman-head 45ª also provides for causing the ram 42 to remain down during the operation of lifting the mold, so as to eject the molded brick out of the mold and allow the carrier 55 to carry the ejected brick out of the machine.

It is to be noted that the toggle 43 and the pitman 45 are so arranged that when the main-crank 26 has reached its full stroke, in the direction of the toggle, the latter will, nevertheless, not be in vertical alinement. The object hereof is to cause the immediate relief of the ram from the pressure of the toggle the instant the main-crank has made its full stroke, and starts in the opposite direction. From that instant, therefore, the weight of the ram only will be imposed upon the stock compressed into brick in the mold, and the latter may with safety be lifted to eject the brick therefrom.

The mold lifting devices are so arranged as to be operated the instant, just referred to, when the main-crank 26 has made its full stroke in the direction of the toggle 43, and starts in the opposite direction. The mold is suspended by a pair of links 49 from correspondingly positioned crank-arms 50, rigid on the transverse shaft 51, journaled in the frame sides 52. The rock-shaft 51 is operated by an arm 53 (shown only in Figs. 1 and 3) rigid thereon and provided at its extremity with a stud-roller 54 running on the outer face of the rim-flange of the cam 25, fast on the main crank-shaft 26.

The carrier 55, by which the pressed brick is carried out of my machine, is operatively so arranged as to cause one of the cross-bars 56, 56$^a$ to pass under the mold 28, and take hold of the brick ejected therefrom as soon as the mold is lifted to its highest point; and the mold lifting devices are coöperatively so arranged as to hold the mold uplifted the required length of time to allow said cross-bar of the carrier to pass under the mold. As soon as the cross-bar of the carrier has passed by under the mold, the latter is dropped back into its receiving position. The mold is counter-balanced by a weight (not shown) suspended on the outer end of an arm 56, rigidly mounted on the rock-shaft 51, so as to facilitate an easier lifting and lowering movement of the mold. The mold is lowered by gravity.

During the descending or compressing movement of the ram 42, the plungers 27, 27$^a$ return to their initial position, the vertical gate 8 closes, and the horizontal gates 7 open.

The carrier 55 comprises two sprocket-chains 55$^a$, spaced apart and running over a pair of sprocket-wheels 57, 58. The sprockets 57 are idlers, but the sprockets 58 are rigidly mounted on the transverse shaft 59. On the latter is also mounted a sprocket 60. The sprocket-chain $s$ connects and transmits power to the sprocket 60 on the shaft 59, and the sprocket $r$ on the shaft $f$, and in so doing drives the feeding mechanism, and the carrier 55.

The sprocket 61 as seen in Figs. 1 and 3 is loose on its shaft $f$ and means are provided for engaging and driving its shaft similar in construction and operation as like means provided for connecting the sprocket $u$ with its shaft $g$, above described, and it is not deemed necessary to again detail such means here. The arm 11$^a$ on the shaft 11, operating the gates 7, is connected by a rod 63, with a rockable stop 64; and thus when the gates 7 are closed, the stop 64 is thrown into the path of the spring-controlled drive-pawl 65 (see Fig. 3) of the sprocket $r$, tripping such drive-pawl, and by so doing interrupting the transmission of motion to the compressor $i$, which thenceforth remains inactive until the gates 7 are again opened. The rod 63 is provided with a spring bearing 66, so as to have a yielding contact with the stop 64.

The main driving-wheels 16, 16$^a$ are driven by pinions 67 fast on a shaft 68, on which shaft is mounted a pulley 69. To retain the ram 42 and the mold-frame 28 in place they are provided with guide-flanges 70, 71, respectively, sliding on vertical guide-bars 72. The guide-bars 72 are threaded at the ends to receive nuts 73, 74, and in fact also constitute the tie or tension rods of my machine, bearing the working stress during the action of the ram 42 in compressing the stock in the mold 28.

The frame sides 52 are supported on I-beams 75, 76; 76$^a$ and 76$^b$ are transverse frame-members arranged intermediate of the I-beams 75.

77 is a bolster on which is mounted a plate 78, on which the mold 28 is seated when in its receiving position. See Figs. 1, 4, 28. The plate 78 is secured between ledges or flanges 79, 79$^a$. Connected to the bolster 77 are ways 80, 81, over which travel the chains 55$^a$ of the carrier 55. The bars 86, intermediate of the ways 81, are provided to support the brick while being slid from under the mold by one of the cross-bars 56 or 56$^a$ of the carrier 55.

82 is the bearing for the shaft 83 of the sprockets 57, and 84 is the bearing for the shaft 59 of the sprockets 58.

The space 85 in Fig. 1 represents the form of the brick molded in the mold 28 by the operation of my machine.

87 are frame-brackets, constituting the frame-sides of the front end of my machine.

The spring-controlled pitmen 12 and 36, operating the horizontal gates 7 and the plungers 27, 27$^a$, are made yielding so as to prevent breakage in case of any solid substance blocking the paths of said gates or plungers. The construction of said pitmen is self evident from an inspection of Fig. 17. By the adjustment of the nut 12$^a$ the spring 12$^b$ is given sufficient tension and the pitman sufficient rigidity to perform its ordinary work without yielding, the pitman having, nevertheless, by reason of the arrangement described, sufficient yielding capacity to allow the bell-cranks 12 and 37 to make their full movement, notwithstanding the arms 10 and 33 are forcibly resisted by obstructions in the path of either of the gates 7 or the plungers 27, 27ª.

In Fig. 29 I have shown how my machine could be modified, if desired, to assemble the parts thereof in such manner as to bring them in more vertical arrangement than shown in the preceding views. I, however, prefer the arrangement of my machine as already described, and in order to make the comparisons between the two types of machines convenient, I shall refer to said type of machine hereinbefore described as my preferred type, to distinguish the same from my modified type.

In the modified type of my machine, all parts and operations of the movable and operating mechanisms are substantially the same as specified concerning my preferred type, except in the following particulars: In my said preferred type, the arms 20 and 53 and the operating means therefor are so arranged as to cause the rollers on the extremities of the last mentioned arms to bear up against the exterior of the flanges of the cams 23, 25, respectively. While in my modified type, the stud-roller on the extremity of the arm 92 is necessarily held to its work by providing the cam 88, (shown in detail in Fig. 30) with cam-flanges 89, 90, constituting a run-way for the roller 91 on said arm 92; and the cam 93 is made with cam-flanges 94, 95, providing a run-way for the stud-roller 96 on the arm 97. It will be noted that the cams 88 and 93 of my modified type are equivalents of the cams 23 and 25 of my preferred type, and likewise that the arms 92, 97 are the equivalents of the arms 20 and 53 of my preferred type. In Fig. 29 the cam 93 is shown in broken outline, but the outline of the cam 88 is omitted to avoid confusion of lines. Furthermore, in the preferred type of my machine, the weight of the ram 42 is used as a controlling force to hold the arm down for the interval the mold 28 is lifting; while in my modified type, the weight of the toggle 98, if unrestrained, would have just the opposite effect, moving the ram 99 when it should be at rest, and, therefore, I provide the cam 93 with a segmental rib 100ª, concentric with the main crank-shaft 101 (the equivalent of the main shaft 26 of my preferred type) which rib 100ª is positioned opposite the rib 100, the latter being arranged to hold the pitman down for an interval, similar to the action of the rib 48 of the cam 25 of my preferred type, while the rib 100ª is arranged to pass under the stud-roller 102 of the pitman 103, at the moment the main crank-shaft 101 has operated said pitman to fully expand the toggle 98 and is about to recede, during a part of which receding movement the pitman 103, and therewith the toggle 98, is supported uplifted by said rib 100ª, thereby causing the ram 99 to be at rest while the mold 105 is being operated to eject the molded brick, which falls down a chute 106. In the process of molding the brick, the mold 105 would be positioned as shown in Fig. 29, while the ram 99 would bear against a plate 112, supported by the frame 113, and upon the moving of the mold 105 away from said plate 112 the brick, 114, would simply drop down the chute 106.

My modified machine I consider only convenient to use for certain manufactures, such for example as fuel briquets, but my object in making the foregoing brief description thereof was to show a modified application of the principles and features of my invention.

The hopper 107, the stock-compressor 108, the plunger 109 and the gates 110, 111, of my modified type, all perform substantially the same functions as their equivalents of my prefererd type of machine, and are connected by suitable motion-transmitting devices with the main crank-shaft, the details of which features I do not deem necessary to herein set forth at length, since they are self suggesting to every practical mechanic from the description of my preferred type hereinbefore given.

The compressor 108 of my modified type would be operated by devices the equivalents of those provided in my preferred type of machine, and an automatic feeder may also be provided for feeding stock into the hopper 107, said automatic feeder being arranged substantially as in my preferred type of machine, the driving power for the compressor and feeder of my modified type being transmitted from the main crank-shaft 101 by a suitable arrangement of the sprocket-gears and sprocket-chains not conveniently shown and therefore omitted.

I claim:

1. A brick-making machine comprising a hopper, a measuring-chamber into which the hopper discharges, a gate controlling the inlet and a gate controlling the outlet of said measuring-chamber, a plunger in said measuring chamber, a reciprocating mold into which the measuring-chamber opens, a seat-plate against which the mold is seated when in its receiving position, a reciprocating ram arranged to telescope in the mold and compress the material contained therein, and a driven shaft and connections therefrom arranged to operate said operating parts in relative synchronism, said driving connections being arranged to cause the ram to be at rest during the movement of the mold from its seat-plate.

2. A brick-making machine comprising a hopper, a measuring-chamber into which the hopper discharges, a gate controlling the inlet and a gate controlling the outlet of said measuring-chamber, a plunger in said measuring-chamber, a vertically movable mold, a seat-plate against which the mold is seated when in its receiving position, a vertically movable ram, and a driven shaft and connections therefrom arranged to operate said operating parts in relative synchronism, said driving connections being arranged to cause the ram to be at rest during the movement of the mold from its seat-plate.

3. A brick-making machine comprising a hopper, automatic stock-feeding devices emptying therein, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a driven shaft and connections therefrom arranged to operate said operating parts in relative synchronism, said driving connections being arranged to cause the ram to be at rest during the movement of the mold from its seat-plate, and means arranged to automatically arrest the operation of said stock-feeding devices during the interval the gate controlling the inlet of the measuring-chamber is closed.

4. A brick-making machine comprising a hopper, automatic stock-feeding devices emptying therein, an auger-like rotating compressor pendent in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a driven shaft and connections therefrom arranged to operate said operating parts in relative synchronism, said driving connections being arranged to cause the ram to be at rest during the movement of the mold from its seat-plate, and means arranged to automatically arrest the operation of the compressor and said stock-feeding devices during the interval the gate controlling the inlet of the measuring-chamber is closed.

5. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a driven shaft and connections therefrom arranged to operate said operating parts in relative synchronism, said driving connections being arranged to cause the ram to be at rest during the movement of the mold from its seat-plate, and means arranged to automatically arrest the operation of the compressor and said stock-feeding devices during the interval the gate controlling the inlet of the measuring-chamber is closed.

6. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat-plate, and means arranged to automatically arrest the operation of the compressor and said stock-feeding devices during the interval the gate controlling the inlet of the measuring-chamber is closed.

7. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat-plate, and means arranged to automatically arrest the operation of the compressor and said stock-feeding devices during the interval the gate controlling the inlet of the measuring-chamber is closed.

8. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat-plate, means arranged to arrest the rotation of the compressor thrown into action when the latter is lifted above a predetermined height in the hopper, and means arranged to automatically arrest the operation of the compressor and said stock-feeding devices during the interval the gate controlling the inlet of the measuring-chamber is closed.

9. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, adjustable means arranged to counter-balance said compressor, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat-plate, means arranged to arrest the rotation of the compressor thrown into action when the latter is lifted above a predetermined height in the hopper, and means arranged to automatically arrest the operation of the compressor and said stock-feeding devices during the interval the gate controlling the inlet of the measuring-chamber is closed.

10. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, adjustable means arranged to counter-balance said compressor, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat-plate, means arranged to arrest the rotation of the compressor thrown into action when the latter is lifted above a predetermined height in the hopper, guide-bars on which slide said mold and ram, said guide-bars being arranged to constitute tie-rods receiving the stress of the work of the ram, and means arranged to automatically arrest the operation of the compressor and said stock-feeding devices during the interval the gate controlling the inlet of the measuring-chamber is closed.

11. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the rotation of the compressor thrown into action when the latter is lifted above a predetermined height in the hopper, means arranged to automatically arrest the operation of the compressor and said stock-feeding devices during the interval the gate controlling the inlet of the measuring-chamber is closed, a toggle arranged to force the ram in the mold, connections between the driven shaft and the toggle, said connections being arranged to cause the ram to be at rest during the movement of the mold from its seat, and means adapted to relieve the force of the toggle on the ram immediately after the full expansion of the toggle.

12. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the rotation of the compressor thrown into action when the latter is lifted above a predetermined height in the hopper, a toggle arranged to force the ram in the mold, and a pitman connecting said toggle with said driven shaft, the connection of said pitman with the latter being adapted to provide for limited longitudinal play, for the purpose specified.

13. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the rotation of the compressor thrown into action when the latter is lifted above a predetermined height in the hopper, a toggle arranged to force the ram in the mold, a pitman connecting said toggle with said driven shaft, the connection of said pitman with the latter being adapted to provide for limited longitudinal play, for the purpose specified, and said pitman being arranged to limit the full expansion movement of said toggle to a position not bringing the members thereof in straight alinement.

14. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the action of the stock-feeding devices and the compressor thrown into action when the compressor is lifted above a predetermined height in the hopper, means arranged to automatically arrest the operation of the compressor and said stock-feeding devices during the interval the gate controlling the inlet of the measuring-chamber is closed, a toggle arranged to force the ram in the mold, and connections between the driven shaft and the toggle, said connections being arranged to cause the ram to be at rest during the movement of the mold from its seat.

15. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a driven shaft and connections therefrom arranged to operate said operating parts in relative synchronism, means arranged to arrest the action of the stock-feeding devices and the compressor thrown into action when the compressor is lifted above a predetermined height in the hopper, means arranged to automatically arrest the operation of the compressor and said stock-feeding devices during the interval the gate controlling the inlet of the measuring-chamber is closed, a toggle arranged to force the ram in the mold, a pitman connecting said toggle with said driven shaft, the connection of said pitman with the latter being adapted to provide for limited longitudinal play, for the purpose specified, and said pitman being arranged to limit the full expansion movement of said toggle to a position not bringing the members thereof in straight alinement.

16. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the action of the stock-feeding devices and the compressor thrown into action when the compressor is lifted above a predetermined height in the hopper, means arranged to automatically arrest the operation of the compressor and said stock-feeding devices during the interval the gate controlling the inlet of the measuring-chamber is closed, a toggle arranged to force the ram in the mold, a pitman connecting said toggle with said driven shaft, the connection of said pitman with the latter being adapted to provide for limited longitudinal play, for the purpose specified, and said pitman being arranged to limit the full expansion movement of said toggle to a position not bringing the members thereof in straight alinement.

17. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the action of the stock-feeding devices and the compressor thrown into action when the compressor is lifted above a predetermined height in the hopper, guide-bars on which slide said mold and ram, said guide-bars being arranged to constitute tie-rods receiving the stress of the work of the ram, means arranged to automatically arrest the operation of the compressor and said stock-feeding devices during the interval the gate controlling the inlet of the measuring-chamber is closed, a toggle arranged to force the ram in the mold, a pitman connecting said toggle with said driven shaft, the connection of said pitman with the latter being adapted to provide for limited longitudinal play, for the purpose specified, and said pitman being arranged to limit the full expansion movement of said toggle to a position not bringing the members thereof in straight alinement.

18. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, adjustable means arranged to counter-balance said compressor, a measuring-chamber into which the hopper discharges, a gate controlling the inlet and a gate controlling the outlet of said measuring-chamber, a plunger in said measuring-chamber, a reciprocating mold into which the measuring-chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, means arranged to arrest the action of the stock-feeding devices and the compressor thrown into action when the compressor is lifted above a predetermined height in the hopper, guide-bars on which slide said mold and ram, said guide-bars being arranged to constitute tie-rods receiving the stress of the work of the ram, means arranged to automatically arrest the operation of the compressor and said stock-feeding devices during the interval the gate controlling the inlet of the measuring-chamber is closed, a toggle arranged to force the ram in the mold, a pitman connecting said toggle with said driven shaft, the connection of said pitman with the latter being adapted to provide for limited longitudinal play, for the purpose specified, and said pitman being arranged to limit the full expansion movement of said toggle to a position not bringing the members thereof in straight alinement.

19. A brick-making machine comprising a hopper, automatic stock-feeding devices emptying therein, an auger-like rotating compressor pendent in said hopper, means suspending said compressor vertically movable and arranged to impose the weight thereof on the material contained in said hopper, a measuring chamber into which the hopper discharges, a gate controlling the inlet, and a gate controlling the outlet of said measuring chamber, a plunger in said measuring chamber, a reciprocating mold into which the measuring chamber opens, a seat-plate against which the mold is seated when in its receiving position, a reciprocating ram arranged to telescope in the mold and compress the material contained therein, a carrier arranged to slide the molded brick out of the machine while the mold is spaced from its seat-plate, a driven shaft and connections therefrom arranged to operate said operating parts in relative synchronism, said driving connections being arranged to cause the ram to be at rest during the movement of the mold from its seat, means arranged to arrest the action of the stock-feeding devices, and a compressor thrown into action when the latter is lifted above a predetermined height in the hopper, means arranged to throw said stock-feeding devices into activity when said compressor is positioned below such predetermined height in the hopper, and means arranged to automatically arrest the operation of the compressor and said stock-feeding devices during the interval the gate controlling the inlet of the measuring chamber is closed.

20. In a brick-making machine, the combination of a hopper, automatic stock-feeding devices emptying therein, an auger-like rotating compressor pendent in said hopper and vertically movable, means arranged to arrest the action of the stock-feeding devices and the compressor, said means being thrown into action when the compressor is lifted above a predetermined height in the hopper, and means arranged to throw said stock-feeding devices into activity when said compressor is positioned below such predetermined height in the hopper.

21. In a brick-making machine, the combination of a hopper, automatic stock-feeding devices emptying therein, a measuring-chamber into which the hopper discharges, a gate controlling the inlet and a gate controlling the outlet of said measuring-chamber, a mold, a ram arranged to compress the material contained therein, operating means working said movable devices in relative synchronism, and means arranged to automatically arrest the operation of said stock-feeding devices during the interval the gate controlling the inlet of the measuring-chamber is closed.

22. In a brick-making machine, the combination of a hopper, automatic stock-feeding devices emptying therein, an auger-like rotating compressor pendent in said hopper, a measuring-chamber into which the hopper discharges, a gate controlling the inlet of said measuring-chamber, a mold, a ram, means operating said movable devices in relative synchronism, and means arranged to automatically arrest the operation of the compressor and said stock-feeding devices during the interval the gate controlling the inlet of the measuring-chamber is closed.

23. In a brick-making machine, the combination of a hopper, an auger-lke stock-feeding device emptying therein, means suspending said compressor vertically movable and arranged to impose the weight thereof on the material contained in said hopper, and means arranged to arrest the rotation of the compressor thrown into action when the latter is lifted above a predetermined height in the hopper.

24. In a brick-making machine, the combination of a hopper, automatic stock-feeding devices emptying therein, an auger-like rotating compressor pendent in said hopper, means suspending said compressor vertically movable and arranged to impose the weight thereof on the material contained in said hopper, and means arranged to arrest the action of the stock-feeding devices and the compressor thrown into action when the compressor is lifted above a predetermined height in the hopper.

25. In a brick-making machine, the combination of a hopper, automatic stock-feeding devices emptying therein, an auger-like rotating compressor pendent in said hopper, means suspending said compressor vertically movable and arranged to impose the weight thereof on the material contained in said hopper, a measuring-chamber into which the hopper discharges, a gate controlling the inlet and a gate controlling the outlet of said measuring-chamber, means arranged to arrest the action of the stock-feeding devices and the compressor thrown into action when the compressor is lifted above a predetermined height in the hopper, and means arranged to automatically arrest the operation of the compressor and said stock-feeding devices during the interval the gate controlling the inlet of the measuring-chamber is closed.

26. In a brick making machine, the combination of a reciprocating mold into which the measuring-chamber opens, a reciprocating ram arranged to telescope in the mold and compress the material contained therein, tie rods arranged as guide-bars and on which slide said mold and ram, said tie rods being arranged to receive the stress of the work of the ram, a driving element, and connections relatively operating said mold and ram.

JAMES A. PLOPPER.

Witnesses:
CECIL LONG,
A. D. GERKING.